(No Model.)

W. W. CANBY.
BEAM CLAMP AND HANGER.

No. 470,102. Patented Mar. 1, 1892.

WITNESSES:
F. McArdle
C. Sedgwick

INVENTOR:
W. W. Canby
BY Munn & Co.
ATTORNEYS

UNITED STATES PATENT OFFICE.

WILLIAM WARREN CANBY, OF PHILADELPHIA, PENNSYLVANIA.

BEAM CLAMP AND HANGER.

SPECIFICATION forming part of Letters Patent No. 470,102, dated March 1, 1892.

Application filed November 20, 1891. Serial No. 412,497. (No model.)

*To all whom it may concern:*

Be it known that I, WILLIAM WARREN CANBY, of Philadelphia, in the county of Philadelphia and State of Pennsylvania, have invented a new and useful Improvement in Beam Clamps and Hangers, of which the following is a full, clear, and exact description.

This invention consists in a novel construction of adjustable clamps for I or other shaped beams, girders, and the like capable of being used as a hanger for steam, gas, water, and other pipes, and various other articles, and also applicable to bridge-building or iron construction work of different kinds wherever a clamp or hanger of like kind may be found serviceable, substantially as hereinafter described, and more particularly pointed out in the claims.

Reference is to be had to the accompanying drawings, forming a part of this specification, in which similar letters of reference indicate corresponding parts in all the figures.

Figure 1:
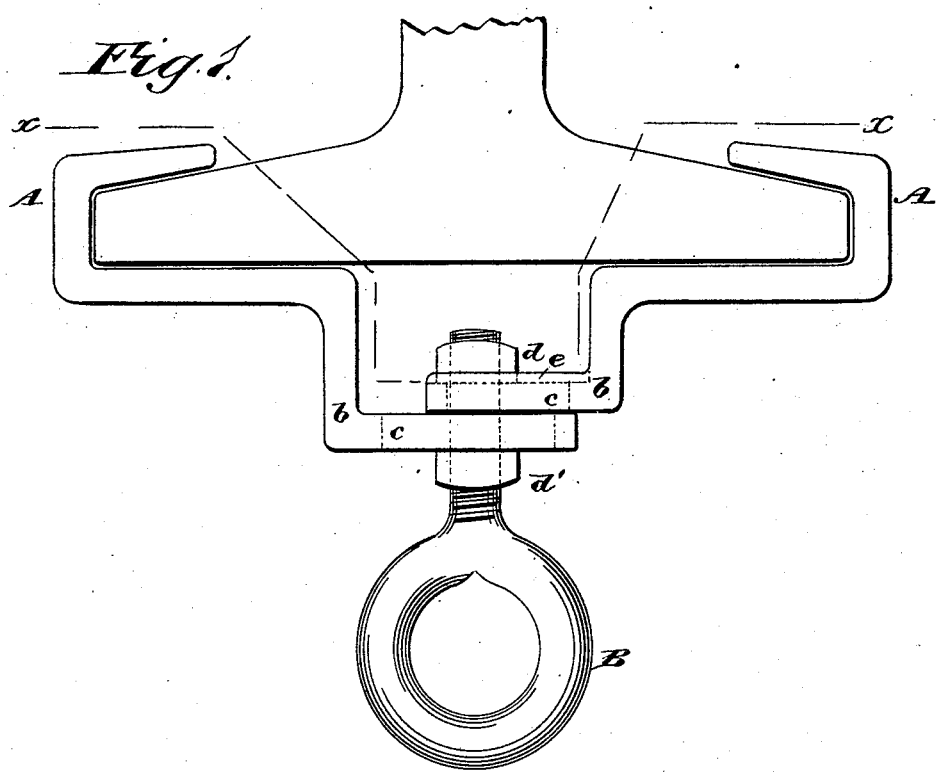
Figure 2:
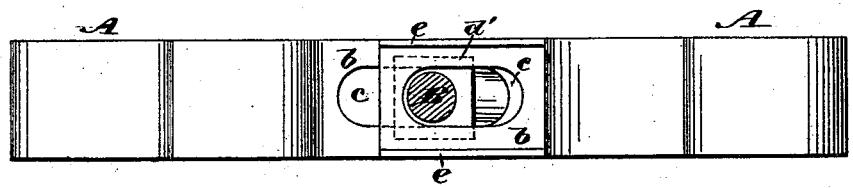
Figure 3:
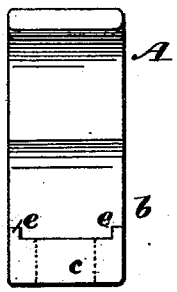

Figure 1 represents a longitudinal elevation of my improved beam-clamp adapted to be used as a hanger for pipes and shown as applied to the base part of an I-shaped beam, which is represented only in part. Fig. 2 is a horizontal section of the same upon the irregular line $x\ x$ in Fig. 1, omitting the beam; and Fig. 3, an inner end view of one of the halves of the clamp detached.

The clamp is generally composed of two main halves or sections A A of jaw or clip shape at their upper ends or portions to lap over and under opposite sides of the beam and having bent inner and lower arms or legs $b\ b$, which are fitted to rest one on or over the other. By thus extending the leg $b$ of the one clamp-section under the other leg, the other clamp-section is strengthened as well as supported, and the two clamp-sections can be slid along on each other, and when the desired position of the two clamp-sections apart to clip the beam is reached their leg portions $b\ b$ can be brought into close contact and firmly held there by a bolt, having upper and lower nuts passed through longitudinally-oblong slots $c$ in the base portion of each leg $b$. As shown in the drawings, this bolt B has an eye at one end to adapt the clamp to form a hanger for pipes of various kinds, and it may be lowered or raised to give greater or less elevation to its eye below, as required, before tightening up the lower one of two nuts $d\ d'$, which, in connection with the bolt, hold the leg portions $b\ b$ of the clamp-sections firmly together. The pipe to be carried may either pass through and rest within the eye of this bolt B or be otherwise suspended from it. A solid bolt instead of an eye-bolt might be used, if preferred, especially where the clamp is designed to carry other articles or bodies than pipes, and the upper or jaw ends of the clamp-sections A A may be differently shaped to suit other styles or shapes of beams.

The two surfaces of the leg portions $b\ b$ of the clamp-sections which come in contact with each other may be of a roughened or toothed construction to prevent them slipping; but I prefer to make said surfaces smooth, so as to get a finer adjustment.

By constructing each leg portion $b$ of both clamp-sections with a longitudinally-oblong slot $c$ in it for the eye or other bolt passing therethrough said bolt may be brought to a central position in the length of the whole clamp, so that there will be an equal strain on the clamp-sections when adjusted to their proper distance apart to suit the width of the beam they are applied to. Thus the clamp or hanger can be slid or adjusted in direction of its length to suit different widths of beams, as well as adjusted along the beam to occupy different positions thereon, and by the aid of the nuts $d\ d'$ and bolt passing through the base portions of the legs the clamp is firmly held to its piece. To more securely lock it, however, I provide the base of the leg $b$, which is the uppermost one, on its top surface with two ribs or projections $e\ e$, that will hold the upper nut $d$ from turning while the lower nut $d'$ is being screwed or set up in place.

The whole device is simple, strong, easily made, and readily adjustable in various directions.

Having thus fully described my invention, I claim as new and desire to secure by Letters Patent—

1. In beam clamps and hangers, the combination of the jaw or clip shaped opposite clamp-sections provided with longitudinally-slotted bent legs at their inner ends, fitted to slide one upon or under the other, a screwbolt passing up through and below said slotted base portions of the legs, and nuts on said bolt applied both above and below said slotted portions, substantially as specified.

2. In a beam clamp and hanger, the opposite jaw or clip shaped clamp-sections provided with bent legs at their inner ends, having longitudinally-slotted base portions fitted to slide one upon or under the other, the upper one of said base portions provided with nut-locking ribs or projections on its upper surface, in combination with the bolt and nuts both above and below the base portions of the legs securing the clamp-sections together, essentially as described.

3. In a beam clamp and hanger, the raising and lowering eyebolt B, provided with upper and lower nuts $d\ d'$, in combination with the jaw or clip shaped sections A A, having longitudinally-slotted legs $b\ b$ fitted to slide at their base portions one upon or under the other, substantially as specified.

WILLIAM WARREN CANBY.

Witnesses:
AUGUSTA P. CANBY,
R. G. J. PRESCOTT.